United States Patent
Stark et al.

(10) Patent No.: US 7,724,909 B2
(45) Date of Patent: May 25, 2010

(54) AUTOMOBILE AUDIO SYSTEM

(76) Inventors: Michael W. Stark, 29 Paul Revere Rd., Acton, MA (US) 01720; Christopher Ludwig, 2976 Havenwood Dr., White Lake, MI (US) 48383; Hal P. Greenberger, 4 Oxbow Rd., Natick, MA (US) 01760

( * ) Notice: Subject to any disclaimer, the term of this patent is extended or adjusted under 35 U.S.C. 154(b) by 238 days.

(21) Appl. No.: 11/933,172

(22) Filed: Oct. 31, 2007

(65) Prior Publication Data

US 2008/0117038 A1 May 22, 2008

Related U.S. Application Data

(62) Division of application No. 10/290,989, filed on Nov. 8, 2002, now Pat. No. 7,483,539.

(51) Int. Cl.
*H04B 1/00* (2006.01)
*H03G 3/00* (2006.01)
*H03G 5/00* (2006.01)
*H02B 1/00* (2006.01)
*H04R 5/02* (2006.01)

(52) U.S. Cl. .................. 381/86; 381/101; 381/103; 381/104; 381/123; 381/301; 340/455

(58) Field of Classification Search .................. 381/86, 381/124, 61, 78, 302, 307, 18, 123, 17, 58, 381/104, 101, 103, 55; 58/455; 340/455
See application file for complete search history.

(56) References Cited

U.S. PATENT DOCUMENTS 4,039,755 A 8/1977 Berkovitz 4,594,729 A 6/1986 Weingartner et al.

(Continued)

FOREIGN PATENT DOCUMENTS

EP 0729227 A1 8/1996

(Continued)

OTHER PUBLICATIONS

EP Examination Report in related Application No. 05108733.6, Oct. 30, 2007.

(Continued)

*Primary Examiner*—Vivian Chin
*Assistant Examiner*—Douglas J Suthers
(74) *Attorney, Agent, or Firm*—Bose Corporation

(57) ABSTRACT

The invention features a dual-mode audio system for an automobile which in one mode is configured for play while the doors to the automobile are closed, and in a second mode, is configured for play while a door, such as a tailgate, is opened. Additionally, the invention also features a battery monitor which monitors the operating condition of the battery and may estimate the energy capacity of the battery. The system may also take power conservation measures if the system determines that the engine is not running or the operating condition of the batter reaches a predetermined state. The invention also features a remote control integrated within a key fob for controlling the audio system. The invention features various orientations for mounting a pair of loudspeakers within an automobile which directly radiate sound out of a rear opening of the automobile.

2 Claims, 8 Drawing Sheets

U.S. PATENT DOCUMENTS

| | | |
|---|---|---|
| 4,597,470 A | 7/1986 | Takagi |
| 4,641,344 A | 2/1987 | Kasai |
| 4,759,066 A | 7/1988 | Polk |
| 4,866,776 A | 9/1989 | Kasai |
| 4,903,307 A | 2/1990 | Ozawa |
| 5,023,914 A | 6/1991 | Arnold |
| 5,111,508 A | 5/1992 | Gale et al. |
| 5,200,688 A | 4/1993 | Patino et al. |
| 5,208,483 A | 5/1993 | Reneau |
| 5,215,346 A | 6/1993 | Reitzloff |
| 5,680,468 A | 10/1997 | Van Hout .................... 381/389 |
| 5,929,769 A | 7/1999 | Garnault |
| 6,201,246 B1 | 3/2001 | Potekev et al. |
| 6,324,451 B1 | 11/2001 | Regan |
| 6,389,147 B1 | 5/2002 | Rush et al. |
| 7,076,071 B2 | 7/2006 | Katz |
| 7,177,432 B2 | 2/2007 | Eid et al. |
| 2001/0026623 A1 | 10/2001 | Erwin |
| 2002/0136414 A1 | 9/2002 | Jordan et al. |
| 2004/0042624 A1 | 3/2004 | Henderson et al. |
| 2004/0091123 A1 | 5/2004 | Stark |
| 2004/0247141 A1 | 12/2004 | Holmi et al. |
| 2005/0100174 A1 | 5/2005 | Stark et al. |

FOREIGN PATENT DOCUMENTS

| | | |
|---|---|---|
| EP | 1137319 | 9/2001 |
| EP | 0729227 B1 | 7/2002 |
| EP | 1487236 | 12/2004 |
| JP | 2006-109479 | 4/2006 |
| WO | WO03001885 | 1/2003 |

OTHER PUBLICATIONS

EP Extended Search Report in Application No. 05108733.6, dated Mar. 2, 2007.
EP Examination Report in related Application No. 04102444.9, dated Mar. 10, 2008.
Action and Response History retrieved from PAIR for U.S. Appl. No. 10/290,989, through Jun. 30, 2008.
Action and Response History retrieved from PAIR for U.S. Appl. No. 11/933,148, through Jun. 30, 2008.
Action and Response History retrieved from PAIR for U.S. Appl. No. 11/933,183, through Jun. 30, 2008.
Action and Response History retrieved from PAIR for U.S. Appl. No. 11/933,164, through Jun. 30, 2008.
Action and Response History retrieved from PAIR for U.S. Appl. No. 10/457,338, through Jun. 30, 2008.
Press release from Infinity Mobile Systems, "Infinity Audio System Featured in Custom Chrysler PT Cruiser At 2002 SEMA Show" Nov. 5, 2002.
Translation of Official Action from Related Chinese Application No. 2004100452310 dated Mar. 2, 2007.
European Search Report dated Jul. 17, 2006, issued in related European Application No. 04102444.9.
European Examination Report dated Mar. 7, 2007, issued in related European Application No. 04102444.9.
European Office Action for Appl. No. 05108733.6, dated Dec. 2, 2009, 4 pages.

AUTOMOBILE AUDIO SYSTEM

CROSS-REFERENCE TO RELATED APPLICATIONS

This application is a divisional application of and claims priority to U.S. application Ser. No. 10/290,989, filed on Nov. 8, 2002.

TECHNICAL FIELD

This invention relates to audio systems, and more particularly to audio systems for automobiles.

BACKGROUND

Audio systems are included in virtually every automobile manufactured today. These audio systems are typically designed for use while the doors, tailgates, and other openings to the passenger compartment are closed. However, people often choose to listen to their automobile audio system while they are outside of their vehicle, such as while they are camping or "tailgating" at a sporting event. Because traditional automobile audio systems are not designed for this type of use, listeners may not enjoy as high a quality sound presentation as they could if the system were designed for outdoor use.

The acoustic characteristics of a typical vehicle with all of its doors closed will generally be significantly different than the acoustic characteristics of the same vehicle with its tailgate (or one of its doors) open. For example, the linear transfer function from each speaker element to various listening locations will be markedly different in each circumstance. Furthermore, opening or closing of the tailgate significantly alters the acoustic characteristics of the cabin space.

Accordingly, it is desirable to have an automobile audio system which is able to operate in two modes: one mode where one or more parameters of the audio system are configured to better optimize sound quality while the doors (to include tailgates) are closed and a second mode where one or more parameters of the audio system are configured to better optimize sound quality while one or more of the doors, such as a tailgate, are open.

Additionally, users may wish to operate their automobile audio system while the engine is not running and thus drain power from the automobile's battery. It is therefore desirable for an automobile audio system to monitor one or more operating conditions of the battery and adjust system performance in order to extend the maximum period of time the audio system can operate from battery power. It is also desirable to monitor one or more operating conditions of the battery to ensure operation of the audio system does not result in a condition where sufficient battery charge (to allow the automobile to be restarted) is no longer available.

It should be noted that the terms automobile and vehicle are used synonymously in this description and refer to any self-propelled passenger vehicle used for land transport, including cars, trucks, pick-up trucks, sport utility vehicles, and the like. Additionally, the term tailgate refers to a hinged door of an automobile which provides access to a rear opening of the automobile. A tailgate may be hingedly connected to the top, bottom, or side of the frame of the automobile.

SUMMARY

According to an aspect of the invention, a system and method for operating an audio system in an automobile includes implementing a first system configuration, receiving an input indicating a change in operating mode, and in response to this input, implementing a second system configuration which is different from the first system configuration, wherein the second system configuration is implemented when one of the doors, such as a tailgate, of the automobile is open.

Embodiments include one or more of the following features. The first system configuration may occur when all of the doors of the automobile are closed and the second configuration may occur when one or more of the doors, such as a tailgate, are opened.

The audio system may implement a different system topology in the first and second system configurations, where the system topology defines how different signals provided by an audio source are routed to the different speakers of the audio system.

The audio system may implement different signal processing operation in the first and second system configurations. The different signal processing operations in the first and second system configurations may include different equalization signal processing operations, amplification operations, dynamic range control operation, or spatial enhancement operations.

The audio system may also receive input indicating that the automobile's engine is not running, and, in response to this input, the first or second system configuration may be adjusted in order to reduce power consumption of the system. Several adjustments may be made to the first or second system configuration to reduce power consumption including turning off one or more speakers (e.g., by muting the output of the amplifier, placing the amplifier in standby mode, reducing the voltage of the audio signal input to the amplifier to approximately zero, disconnecting the one or more loudspeakers from the amplifier, removing electrical power from the amplifier); reducing the gain in one or more of the signal paths; controlling the maximum output power level of the audio system (e.g., by dynamically adjusting the gain of a variable gain element as a function of a detected level of an audio signal); or changing one or more other signal processing operations in the first or second system configuration.

The audio system may switch between the first and second system configuration by monitoring one or more physical conditions of the automobile (e.g., whether a door is opened, the engine is running, or an occupant is in the automobile) and generate a switch command based on a change in one or more of the monitored physical conditions. The audio system may provide a manual switch accessible to a user and change between system configurations based on the state of the switch. The manual switch may be located on a remote control device (e.g., a key fob) or mounted at one or more locations within the automobile (e.g., on a front or rear control panel).

The audio system may also include a battery monitoring process which receives input indicating one or more operating conditions of the battery (e.g., the battery voltage, discharge current, temperature). The battery monitoring process may compare one or more of the monitored operating conditions to a predetermined state, and if the monitored operating conditions reach the predetermined state, then the system would take a responsive action such as triggering an alarm or reducing the power consumption of the audio system. The battery monitoring process may further estimate the remaining capacity of the battery based on one or more of the monitored operating conditions and compare the estimated capacity to a predetermined value, and, if the estimated capacity reaches or falls below the predetermined value, then the system may take a response action such as triggering an alarm or reducing the power consumption of the audio system.

In another aspect, the invention features a method for remotely controlling an audio system in an automobile with a key fob having a plurality of buttons which includes defining a first set of commands corresponding to each button on the key fob, wherein the first set of command includes a command to actuate the door locks. The method also includes defining a second set of commands corresponding to each button, wherein the second set of commands includes one or more commands for controlling the audio system of the automobile. The method further includes switching between the first and second sets of commands based on a predetermined condition.

Embodiments may include one or more of the following features. The key fob may include a switch having two states, and the predetermined condition is a state of the switch. The audio system may have a first mode of operation and a second mode of operation and the predetermined condition is the state of the mode of operation of the audio system, such that the first set of commands are valid when the audio system is in the first mode of operation and the second set of commands are valid when the audio system is in the second mode of operation.

In another aspect, the invention features a system and method for operating an audio system in a vehicle with a battery that includes monitoring one or more operating conditions of the battery, comparing one or more of the monitored conditions of the battery to a predetermined state, if the monitored operating conditions of the battery reaches the predetermined state, then triggering an alarm.

Embodiments may include one or more of the following features. The alarm may be an audible alarm, visual alarm, or tactile alarm. One or more of the monitored operating conditions of the battery may include sensing the output voltage level of the battery, sensing the discharge current of the battery; or sensing the ambient temperature.

In another aspect the invention features a system and method for operating an audio system in a vehicle with a battery that includes monitoring one or more operating conditions of the battery, comparing one or more of the monitored conditions of the battery to a predetermined state, and if the monitored operating conditions of the battery reaches the predetermined state, then causing the automobile to start its engine.

In another aspect, the invention features a system and method for operating an audio system in a vehicle with a battery that includes monitoring one or more operating conditions of the battery, comparing one or more of the monitored conditions of the battery to a predetermined state, and if the monitored operating conditions of the battery reaches the predetermined state, then turning off a subset of the plurality of speakers.

In another aspect, the invention features a system and method for operating an audio system in a vehicle with a battery that includes monitoring one or more operating conditions of the battery, comparing one or more of the monitored conditions of the battery to a predetermined state and if the monitored operating conditions of the battery reaches the predetermined state, then adjusting one or more of equalization signal processes to change the frequency response of the audio system.

In another aspect, the invention features a system and method for operating an audio system that includes monitoring one or more operating conditions of the battery, comparing one or more of the monitored conditions of the battery to a predetermined state, and if the monitored operating conditions of the battery reaches the predetermined state, then detecting the level of one or more of audio signals received from an audio source, and dynamically adjusting the gain of one or more variable gain elements as a function of the level of one or more audio signals received from an audio source.

In another aspect, the invention features a system and method for operating an audio system that includes monitoring one or more operating conditions of the battery, estimating the remaining capacity of the battery based on one or more of the monitored operating conditions of the battery, comparing the estimated remaining capacity of the battery to a predetermined value; and, if the estimated remaining capacity of the battery is equal to or less than a predetermined value, then causing the audio system to take an action.

Embodiments may include one or more of the following features. The action taken by the audio system in response to reaching or falling below the predetermined value may include triggering an alarm, causing the automobile to start the engine, or reducing the power consumption of the audio system (e.g., by turning off one or more loudspeakers, turning off the system, adjusting one or more equalization processes applied to one or more audio signals to change the frequency response of the audio system).

In another aspect, a system and method for operating an audio system in an automobile includes determining whether the engine is running, and, in response to the system determining that the engine is not running, then changing one or more signal processes to reduce power consumption of the audio system.

Embodiments may include one or more of the following features. The system may reduce power consumption in various ways including by turning off one or more speakers, adjusting one or more of the equalization processes performed on one or more of the received audio signals to change the frequency response of the audio system, reducing the gain in one or more of the audio signal paths.

In another aspect, an audio system for an automobile includes an audio input source, a plurality of loudspeakers, a first set of operating conditions for a first mode of operation, a second set of operating conditions for a second mode of operation, wherein the second set of operating conditions is different from the first set of operating conditions and occurs when one of the doors of the automobile is open, and a switch for changing between the first and second set of operating conditions.

Embodiments may include one or more of the following features. The first set of operating conditions are configured for play while a tailgate is closed and listeners are within the automobile and the second set of operating conditions are configured for play while a tailgate is open and listeners are outside the automobile. The audio system may also include at least one channel of equalization, wherein the first set of operating conditions defines a first frequency response of the channel of equalization and the second set of operating conditions defines a second frequency response of the channel of equalization. The audio system may also include a dynamic range control device configured to receive an audio signal having a first dynamic range and output an audio signal having a second dynamic range, wherein the second dynamic range is different than the first dynamic range. The system may also include a battery monitoring process.

The audio system may also include a rear control panel located within the passenger compartment of the automobile towards the back of the automobile that includes one or more controls for operating the audio system. The rear control panel may include a switch for changing between the first and second set of operating conditions. The rear control panel may also include at least one pair of external audio source line level inputs, an external microphone level input, or a separate video output jack for connection to a video display.

In another aspect, the invention features an audio system for an automobile having a passenger compartment and a tailgate hingidly connected to the top portion of the automobile's frame that includes a first speaker set having a first speaker and a second speaker. The first and second speakers are mounted on the tailgate of the automobile such that each speaker directs sound along a primary axis of radiation and has a fixed orientation such that each speaker's primary axis of radiation directs sound substantially towards the passenger compartment of the automobile when the tailgate is closed, and the speaker's primary axis of radiation is pointed away from the passenger compartment of the automobile and is angled relative to the plane of the ground when the tailgate is opened.

Embodiments may include one or more of the following features. The speakers may be mounted near an upper edge of the tailgate, for example, on the window of the tailgate.

The audio system may be have a first mode of operation configured for play while the tailgate is closed and listeners are within the automobile and a second mode of operation configured for play while the tailgate is opened and listeners are outside the automobile near the rear of the automobile. The audio system may also have a second set of speakers that includes a first and second speaker, and mounted such that each speaker having primary axis of radiation that is pointed substantially towards the rear of the automobile and which direct sound outside the automobile in the second mode of operation.

In another aspect, an audio system for an automobile having a passenger compartment and a tailgate hingidly connected to the automobile's frame and a rear seat or seats having a front portion and a rear portion includes first speaker set that includes a first speaker and a second speaker. The first speaker set is mounted on the rear portion of the rear seat or seats, such that each speaker in the first set of speakers directs sound along a primary axis of radiation and has a fixed orientation such that each speaker's primary axis of radiation directs sound substantially away from the passenger compartment of the automobile towards the tailgate when the tailgate is closed, and the speaker's primary axis of radiation is pointed away from the passenger compartment of the automobile and directs sound out of the rear of the automobile when the tailgate is opened.

In another aspect, an audio system for an automobile having a rear seat, a passenger compartment with a floor, and a tailgate hingidly connected to the automobile's frame includes a first speaker set comprising a first speaker and a second speaker. The first speaker set is mounted on the floor, wherein each speaker in the first set of speakers directs sound along a primary axis of radiation and has a fixed orientation such that each speaker's primary axis of radiation directs sound substantially away from the passenger compartment of the automobile towards the tailgate when the tailgate is closed, and the speaker's primary axis of radiation is pointed away from the passenger compartment of the automobile and directs sound out of the rear of the automobile when the tailgate is opened.

In another aspect, an audio system for an automobile having a rear seat, a passenger compartment with a ceiling, and a tailgate hingidly connected to the automobile's frame includes a first speaker set comprising a first speaker and a second speaker. The first speaker set is mounted on the ceiling, wherein each speaker in the first set of speakers directs sound along a primary axis of radiation and has a fixed orientation such that each speaker's primary axis of radiation directs sound substantially away from the passenger compartment of the automobile towards the tailgate when the tailgate is closed, and the speaker's primary axis of radiation is pointed away from the passenger compartment of the automobile and directs sound out of the rear of the automobile when the tailgate is opened.

In another aspect, an audio system for an automobile having a passenger compartment with a ceiling, floor, and sidewalls, and having a rear opening includes a first speaker set comprising a first speaker and a second speaker. The first speaker set is mounted within the passenger compartment in the rear half of the automobile (e.g., on the floor or ceiling), wherein each speaker in the first set of speakers directs sound along a primary axis of radiation and has a fixed orientation such that each speaker's primary axis of radiation direct sound substantially towards the rear opening of the automobile and wherein the neither speaker in the first speaker set is mounted on a sidewall of the passenger compartment.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
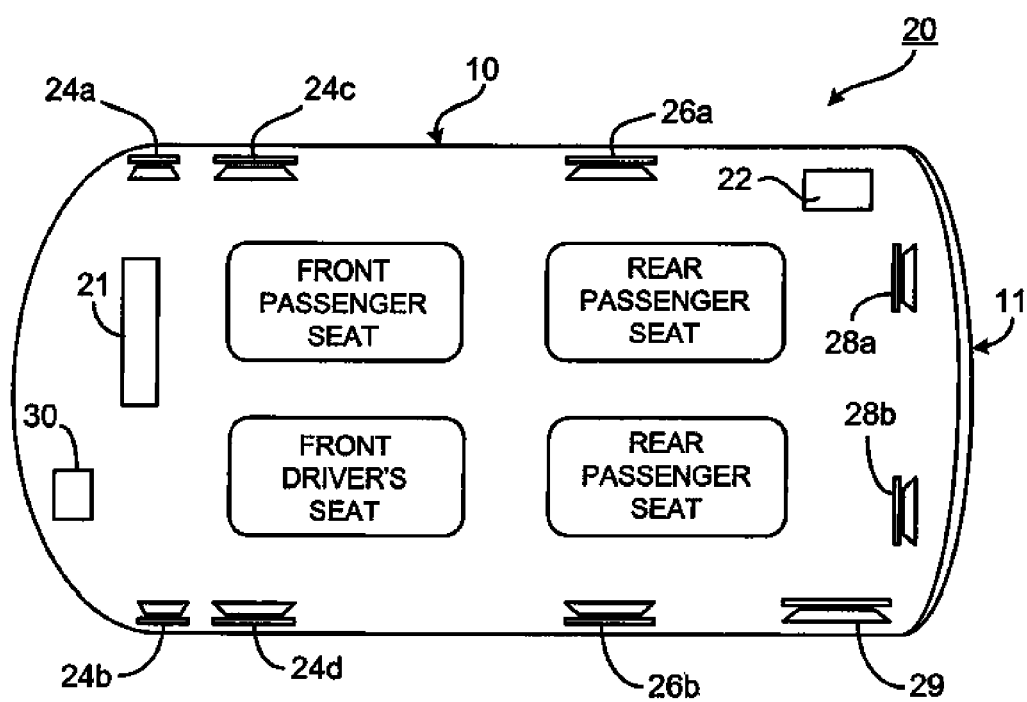
FIG. 1A is a is a top view of an automobile having a dual-mode audio system.

As shown in FIG. 1A, an automobile (e.g., an SUV) 10 includes an audio system 20 that is configured to operate in two modes: a conventional mode and an open mode.

The conventional mode is a mode of operation in which audio system 20 is configured for play when all of the doors of the vehicle are closed and the primary listening position of interest is the seating area within the passenger compartment. In this mode, sound is radiated within the passenger compartment as in a conventional automobile audio system.

The open mode is a mode of operation in which audio system 20 is configured for play when the tailgate 11 is open. In this mode, sound is radiated through the open tailgate and/or through the vehicle's body panels or other openings to the outside environment. The primary listening position of interest in this case is outside of the vehicle, typically in line with the open tailgate 11. In other embodiments, the open mode of operation may be configured for play when one or more doors (including a tailgate) are open.

Because the acoustic characteristics of the vehicle are significantly different when all of the doors are closed versus when one or more doors are opened, and because the listening positions of primary concern are different in the different modes, the audio system 20 adjusts system configuration in order to better optimize performance in each mode. As will be explained in greater detail below, adjustment of system configuration may include altering the system topology for each mode of operation, as well as performing different signal processing operations such as equalization, signal mixing, amplification, dynamic range control, spatial enhancement processes and other signal processing techniques on the channels of audio data in each mode of operation. The system topology defines how different signals provided by an audio source are routed to the different speakers of the audio system.

Additionally, audio system 20 features a battery monitoring process which monitors one or more operating conditions of the automobile battery 30 and takes one or more actions based on whether the system 20 is primarily running off of the battery and the state of one or more of the monitored operating conditions. As will be explained in greater detail below, the battery monitoring process takes various actions including triggering an alarm and altering the system configuration in order to conserve battery power.

Referring again to FIG. 1A, audio system 20 includes one or more audio sources (not shown) such as a stereo radio, CD player, DVD player, and/or an MP3 player, which may be mounted in or near a front control console 21, a rear control console 22, or at another location within the automobile 10. The front and rear control consoles 21, 22 each may contain a set of controls (e.g., volume, source selection, track selection, play, pause, etc.) for the audio sources included within the system 20.

Audio system 20 also includes two pair of front speakers 24a-24b, 24c-24d, a pair of side speakers 26a-26b, a pair of rear speakers 28a-28b, and a woofer 29.

Figure 1B:
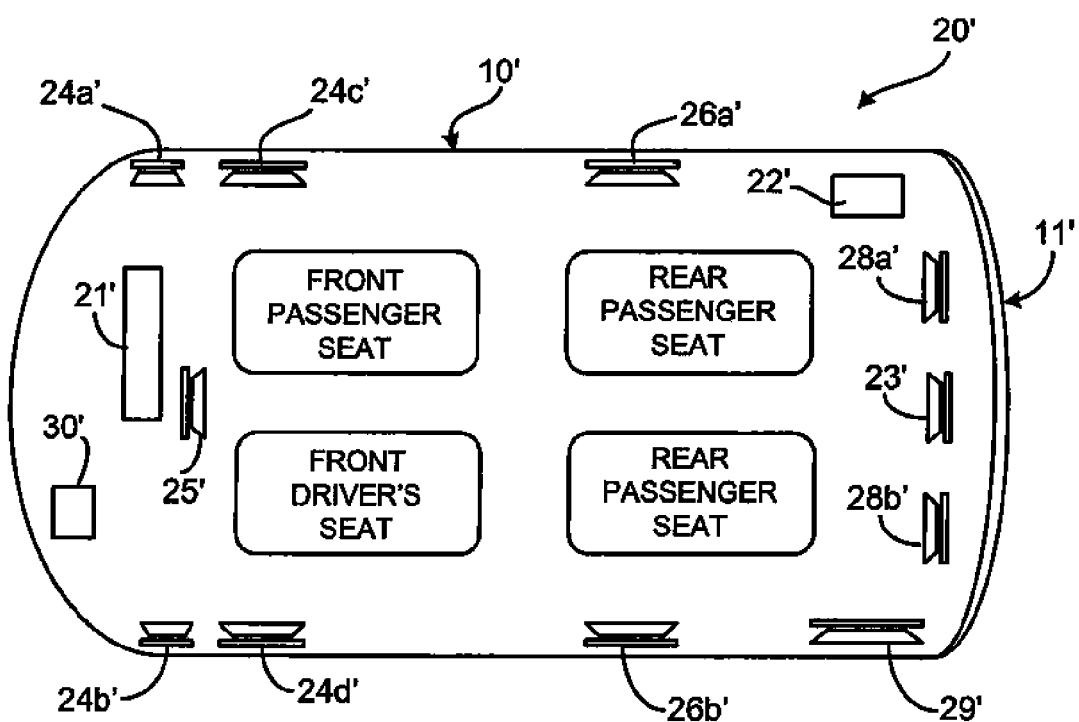
FIG. 1B is a top view of an automobile having another dual mode audio system.

It should be noted that the arrangement of elements, as well as the number of elements shown in FIG. 1A, were chosen to illustrate the novel features of the invention. It should be understood that the invention is not limited to use of the particular configuration of speaker elements and placements shown. For example, as shown in FIG. 1B, another dual-mode audio system 20' may include a front center speaker 25' located in the dashboard of the automobile 10' and a rear center speaker 23' located near the rear of the passenger's compartment in the vehicle.

Figure 2A:
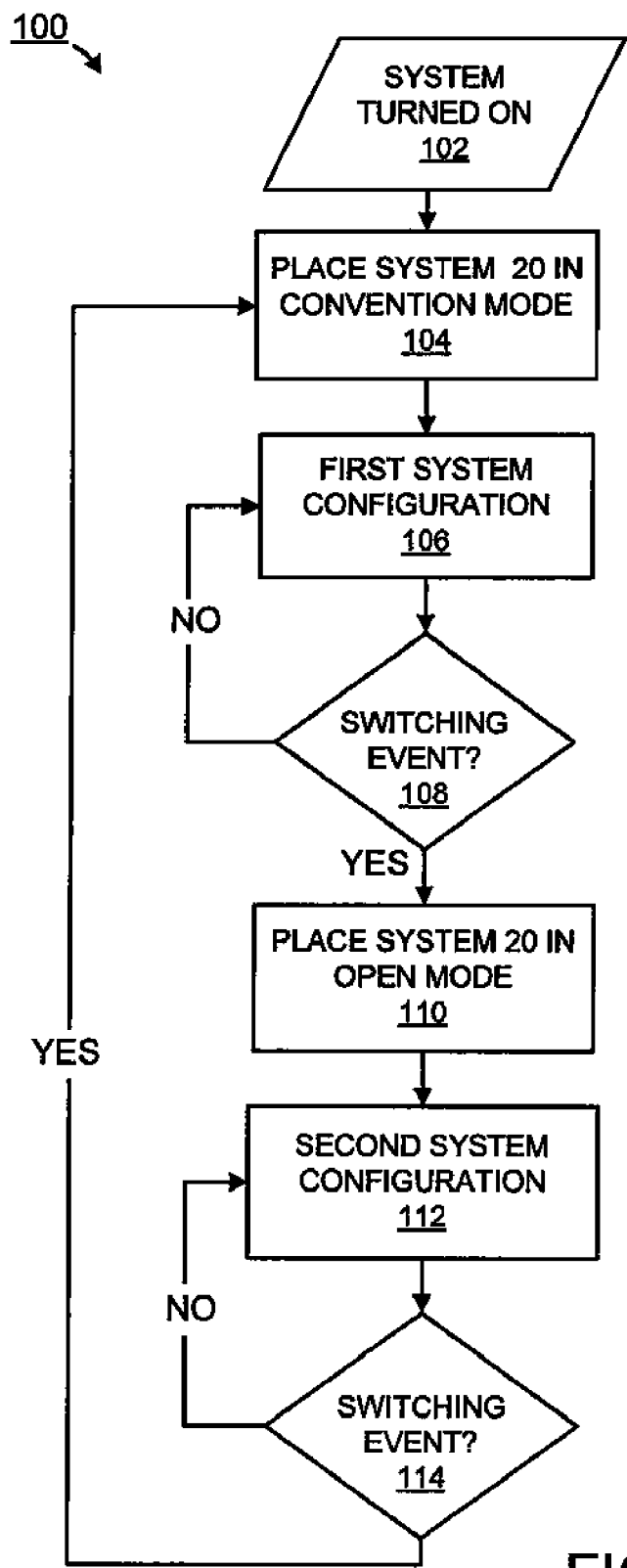
FIG. 2A is a flow-chart illustrating the operation of a mode detection process in a dual-mode audio system.
Figure 3:
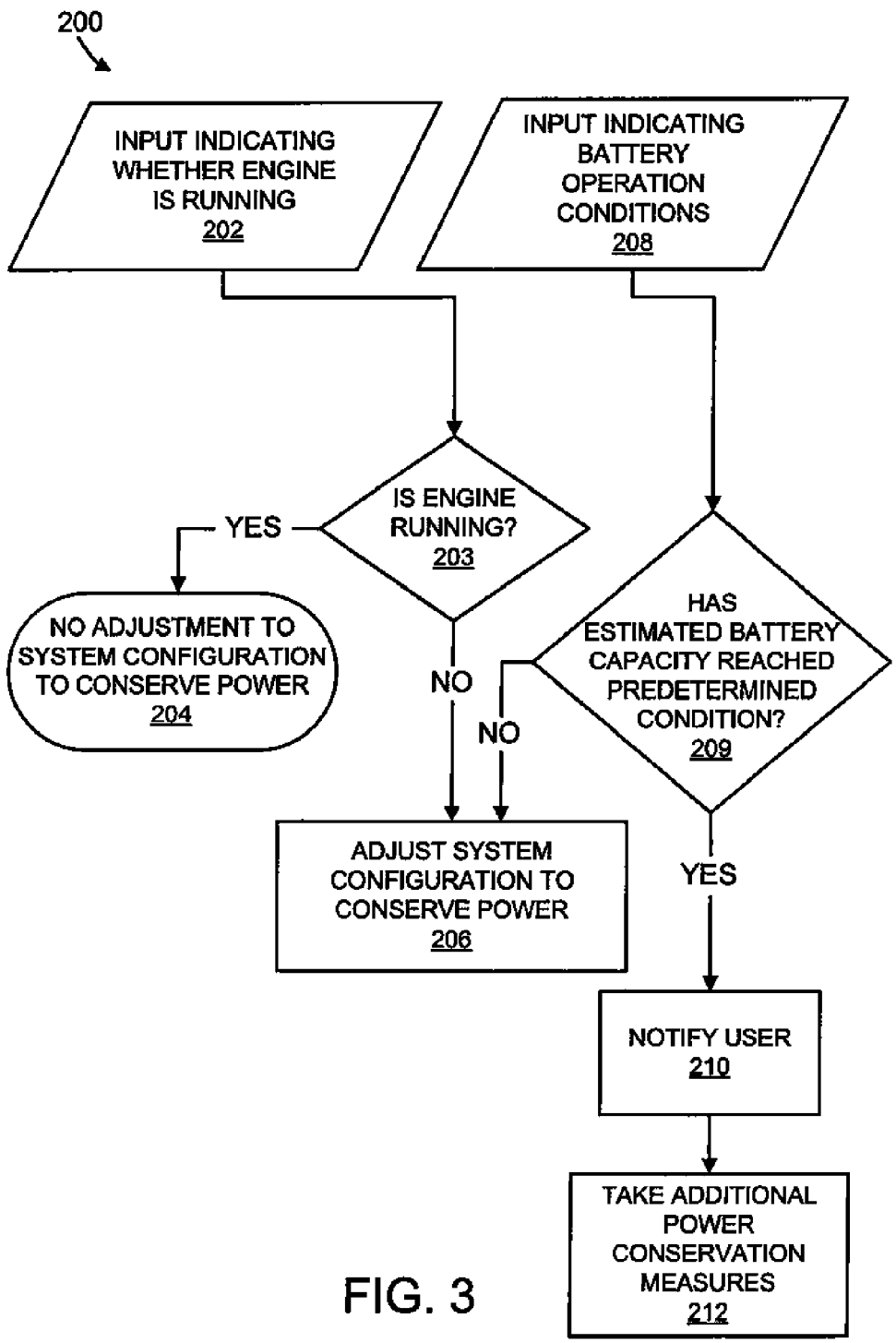
FIG. 3 is a flow-chart illustrating the operation of a battery monitoring process in a dual-mode audio system.

FIGS. 2A and 3 illustrate operation of the audio system 20 shown in FIG. 1A.

As shown in FIG. 2A, the audio system 20 includes a mode detection process 100 which detects when the system 20 is turned on 102 and when a switching event 108, 114 occurs. A switching event occurs when a user changes the state of a switch provided within the system 20. One or more manual switches may be located on the front control panel 21 (shown in FIG. 1A), rear control panel 22, on a remote control device, on a key fob, or in another location. Since it is possible that significant changes would be made in system operation when the mode is changed, having a manual switch keeps from dramatically changing system operation while passengers remain inside the vehicle.

In other embodiments, a switching event may occur automatically. For example, a switching event may occur automatically when the system detects that a tailgate or door is open and the vehicle engine is not running (which can be sensed by the state of the ignition interlock, the RPM of the engine, or some other means). It may also be desirable to sense if passengers remain in the vehicle cabin, which could be done using seat switches, ultrasonic motion detectors, or some other method. Thus, in other embodiments, the system may automatically switch modes to the open mode when the tailgate or door is open, the engine is off, and no passengers are occupying the vehicle cabin.

Referring again to FIG. 2A, when the mode detection process 100 detects that the system 20 has been turned on 102, the process 100 will place the system in a conventional mode of operation 104. By automatically reverting to a conventional mode when the system is turned on, the system avoids a situation where the driver gets into the vehicle and turns on the system after it had been switched to open mode. However, in other embodiments, a mode detection process in a dual-mode audio system could be configured to start up in different modes depending on how the system was turned on or the state of a switch. For example, if the system was turned on using controls mounted in the front of the vehicle, the system may assume that someone would be inside the vehicle and the system should start in conventional mode. If the system were turned on using controls that were easily accessible from outside the vehicle (such as controls located in rear console 22, or controls located on a remote control), the system may be configured to start up in open mode.

When the system 20 is placed in the conventional mode of operation 104, the system 20 is in a first system configuration 106 which, as will be explained in more detail below, has a first system topology and performs a first set of signal processing operations which are configured for play with the doors of the vehicle closed and the primary listening position within the passenger's compartment. The system 20 remains in its first system configuration 106 until a switching event is detected 108.

If a switching event is detected 108, mode detection process 100 places the system in the open mode of operation 110 and the system 20 is changed over to a second system configuration 112 which has a second system topology and performs a second set signal processing operations that is configured for play with the tailgate of the vehicle opened and the primarily listening position outside of the vehicle, near the rear opening.

If another switching event 114 is detected, then the mode detection process 100 reverts the system 20 back to the conventional mode of operation 104 and the system is placed in the first system configuration 106.

In each system configuration, 106, 112, the system 20 has a certain system topology which defines how different signals provided by an audio source are routed to the various speakers in the system. In the first system configuration 106, the system topology is arranged in order to better optimize the system for play with the doors of the automobile closed and the primary listening in the seating area in the passenger compartment. Similarly, in the second system configuration 112, the system topology is arranged in order to better optimize the system for play with a rear tailgate opened and the primary listening position outside the automobile near the rear opening. For example, in an audio system 20 having a speaker configuration similar to the arrangement in FIG. 1A and an audio source which produces 5.1 channels of audio data (i.e., front left, front right, front center, left surround, and right surround of full bandwidth (20-20 kHz) audio data plus a sixth channel of low frequency audio data), the first and second system configuration 106, 112 may have a system topology as shown in Table I.

TABLE I

| Audio Data | System Topology in Conventional Mode (i.e., speakers (shown in FIG. 1A) which receive audio data in the Conventional mode) | System Topology in Open Mode (i.e., speakers (shown in FIG. 1A) which receive audio data in the Open mode) |
| --- | --- | --- |
| Front left audio data | Front left speakers 24b, 24d | Rear left speaker 28b |
| Front right audio data | Front right speakers 24a, 24c | Rear right speaker 28a |
| Front center data | Provided equally to front left and right speakers 24a-24d | Provided equally to rear left and rear right speakers 28a-28b |
| Left Surround audio data | Side left speaker 26b and rear left speaker 28b | Side left speaker 26b and front left speakers 24a, 24d |
| Right Surround audio data | Side right speaker 26a and rear right speaker 28a | Side right speakers 26a and front right speakers 24a, 24c |
| Low Frequency data (i.e., the .1 channel) | Subwoofer speaker 29 | Subwoofer speaker 29 |

In other separate embodiments, many other speaker arrangements and routing of audio data is possible. For example, an audio system may have a speaker arrangement as shown in FIG. 1B and may have an audio source which produces 6.1 channels of audio data including a front left, front right, front center, left surround, right surround, and center surround of full bandwidth (20-20 kHz) of audio data plus a sixth channel of low frequency audio data. In this example, the system configuration 106, 112 may have the system topology as shown in Table II.

TABLE II

| Audio Data | System Topology in Conventional Mode (i.e., speakers (shown in FIG. 1B) which receive audio data in the Conventional mode) | System Topology in Open Mode (i.e., speakers (shown in FIG. 1B) which receive audio data in the Open mode) |
| --- | --- | --- |
| Front left audio data | Front left speakers 24b, 24d | Rear left speaker 28b |
| Front right audio data | Front right speakers 24a, 24c | Rear right speaker 28a |
| Front center data | Front center speaker 25 | Rear center speaker 23 |
| Left Surround audio data | Side left speaker 26b and rear left speaker 28b | Side left speaker 26b and front left speakers 24a, 24d |
| Right Surround audio data | Side right speaker 26a and rear right speaker 28a | Side right speakers 26a and front right speakers 24a, 24c |
| Center Surround audio data | Center rear speaker 23 | Center front speaker 25 |
| Low Frequency data (i.e., the .1 channel) | Subwoofer speaker 29 | Subwoofer speaker 29 |

In other embodiments, a system configuration may include a topology in which one or more speakers are shut off in different modes of operation. For example, referring again to FIG. 1A, the front left and right speakers 24a-24d may be shut off in the open mode of play leaving the side speakers to output left and right surround sound. Alternatively, the side speakers may be shut off in the open mode, leaving the front speakers to output the left and right surround sound. Similarly, the rear speakers 28a-28b may be shut off in the conventional mode leaving the side speakers to output the surround sound.

Other embodiments may shut off front speakers 24a-24d (shown in FIG. 1) and side speakers 26a-26b in open mode. In this arrangement, left, right and center surround signals would be mixed with the left, right and center front signals that are fed to speakers 28a-28b.

In addition to changing the system topology in each mode of operation, the first and second system configuration 106, 112 also perform different signal processing operations in each mode. Signal processing operations may include operations such as equalization, amplification, signal mixing, spatial enhancement, dynamic range control and other signal processing techniques on one or more channels of audio data in order to alter the frequency response (both magnitude and phase as a function of frequency), polarity, and the magnitude of the voltage level of the signals delivered to each of the speaker channels in each the mode of operation.

The first and second system configurations 106, 112, may perform different equalization signal processing operations in order to provide for a different frequency response of the system 20 in each mode of operation. Equalization signal processing may be performed using any of the various techniques known in the art. For example, equalization signal processing may be performed on each channel of audio data by passing the data through one or more digital filters whose filter coefficients are stored in memory and provided to the digital signal processor. Sets of filter coefficients corresponding to each mode of operation would be stored in memory, and the system could switch sets of coefficients according to commands issued by the mode detection process 100.

Equalization processing operations may also be implemented in the analog domain by providing physically separate circuits with separate sets of filters for each mode of operation. Different circuits would be switched into or out of the signal path in accordance with commands issued by the mode control process 100. Alternatively, there may be one physical circuit in which the performance can be dynamically adjusted through use of variable gain circuits, voltage controlled filters, switchable electrical component values, switched capacitor filters, or any other form of adjustable or programmable analog filters or signal processors.

Equalization signal processing operations, whether implemented in the digital or analog domain, should be designed to provide a smoother frequency response of the audio system in each mode of play as compared to the frequency response of the system with no equalization. Furthermore, the frequency response of the system measured at the desired listening position for the open mode of operation (outside of the vehicle in line with the open door or tailgate) should be smoother using the signal processing designed for operation in the open mode than the response would be if the conventional mode signal processing were used. For each mode of operation, the overall measured frequency response of the system measured at each desired listening position will generally be similar in character. However, the frequency response of the signal processing used for each mode will generally be significantly different. For purposes of discussion, it should be noted that we will sometimes refer to signal processing used for equalization as a 'channel of equalization' in this specification. The channel of equalization may be accomplished using either analog or digital techniques. We will also sometimes refer to the frequency response of the signal processing as the 'frequency response of the channel of equalization'.

First and second system configurations 106, 112, may include different amplification processing operations of the audio signals applied to a speaker for each mode of operation. In other words, the first system configuration 106 may include signal processing operations which adjust the amplification of the audio signals in one manner, and the second system configuration may include signal processing operations which adjust the amplification of the audio signals in a different manner. Adjusting the amplification of the audio signals may be performed using any of the techniques known in the art. Adjusting gain can be done in multiple places within the signal path of an audio signal, and the system is not limited in the locations where gain adjustment occurs. For example, the amplification of an audio signal applied to a speaker may be adjusted by changing the gain of an amplifier in the signal path of a particular speaker. In a digital system, the gain for each channel for each mode of operation may be determined by a multiplication coefficient or set of filter coefficients stored in memory and supplied to a digital signal processor in order to control the level of the signal supplied to one or more speakers in each mode of operation. The gain may also be adjusted in the analog domain by controlling a variable gain analog amplifier (or other known methods of controlling gain in an analog system) located in the signal path of each channel of audio data.

The first and second system configurations 106, 112 may perform different signal mixing signal processing functions in each mode of operation. Signal mixing operations involve summing various signals together is various proportions. Mixing may occur in one or both modes of operation. Summing can be accomplished using op amp summer circuitry in the analog domain, or data values can be directly summed by a microprocessor or digital signal processor.

The first and second system configuration 106, 112 may include different spatial enhancement signal processing in each mode of operation. Spatial enhancement signal processing generally improves the spatial character of the sound field created by the system and may be implemented using any of the techniques known in the art. One spatial enhancement technique for two-channel audio involves determining first sum and difference signals by alternately adding and subtracting first and second signals from each other (hereinafter referred to as a matrix operation). Next, some form of signal processing is applied at least to the difference signal (or possibly to both the sum and difference signals, where the processing applied to the sum and difference signals is different), then a second matrix operation (take sum and difference of processed sum and difference signals) is performed to generate third and fourth signals. These third and fourth signals are now spatially enhanced versions of the first and second signals. Other enhancement techniques might only operate on a difference signal. In these methods, a difference of two signals is taken. The difference signal is modified in some manner, then added back to one of the original channels and subtracted from the other of the original channels.

In the open mode of operation, spatial enhancement may be performed on the signals provided to the rear speakers (e.g., speakers 28a-28b in FIG. 1A) since these speakers will most likely be the primary speakers providing sound to listeners. Spatial enhancement may be performed on the complete signals applied to the rear speakers, or may be applied to only a portion of the signals applied to the rear speakers. For example, for reproduction of a surround sound signal source, center channel information may be applied to each rear speaker equally, without any spatial enhancement processing. Simultaneously, left and right channel signals may be applied to left and right speakers respectively. These could be applied with or without spatial enhancement processing. Similarly, left and right surround signals could be applied with or without spatial enhancement processing to left and right speakers respectively, where the spatial enhancement processing used could either be the same as or different from that applied to the left and right channel signals. In one particular embodiment, the second configuration feeds center channel signals equally to rear speakers 28a-28b (shown in FIG. 1A) without spatial enhancement, front left and right signals to left and right rear speakers 28a-28b respectively without spatial enhancement, and spatially enhanced left and right surround signals to left and right rear speakers 28a-28b respectively.

Other combinations of performing spatial enhancement processing of various signals is also possible. For example, a system such as that described in co-pending application titled "Audio Signal Processing" having U.S. Ser. No. 09/886,868 filed on Jun. 21, 2001 and assigned to Bose® Corporation, which is herein incorporated by reference, could be used in the rear of the vehicle, where spatial enhancement processing is used with the configuration of speakers disclosed.

It should be understood that spatial enhancement is not limited to the second system configuration during the open mode of operation, but may also be performed on the audio signals provided to one or more sets of speakers (e.g., the front sets of speakers 24a-24b, 24c-24d or rear sets of speakers 26 a-b, 28 a-b shown in FIG. 1A) in first system configuration during the conventional mode of operation.

It should be noted that other signal processing operations which affect system functions or performance attributes may change in the conventional and open mode of operation. For example, the dynamic range of the audio signal supplied to one or more speakers may be changed depending on the mode of operation. Additionally, balance/fade settings may be changed depending on the operation (e.g., fade control may be shut off or set to some fixed position in the open mode).

Equalization processes, amplification, spatial enhancement, signal mixing, dynamic range adjustment, and other signal processes may take place in either the digital domain with a device such as digital signal processor, microprocessor, digital amplifier, or other suitable digital device, or in the analog domain with separate physical circuits or a single physical circuit with dynamically adjustable elements (e.g., variable gain amplifiers, voltage controlled filters, etc.).

Figure 2B:
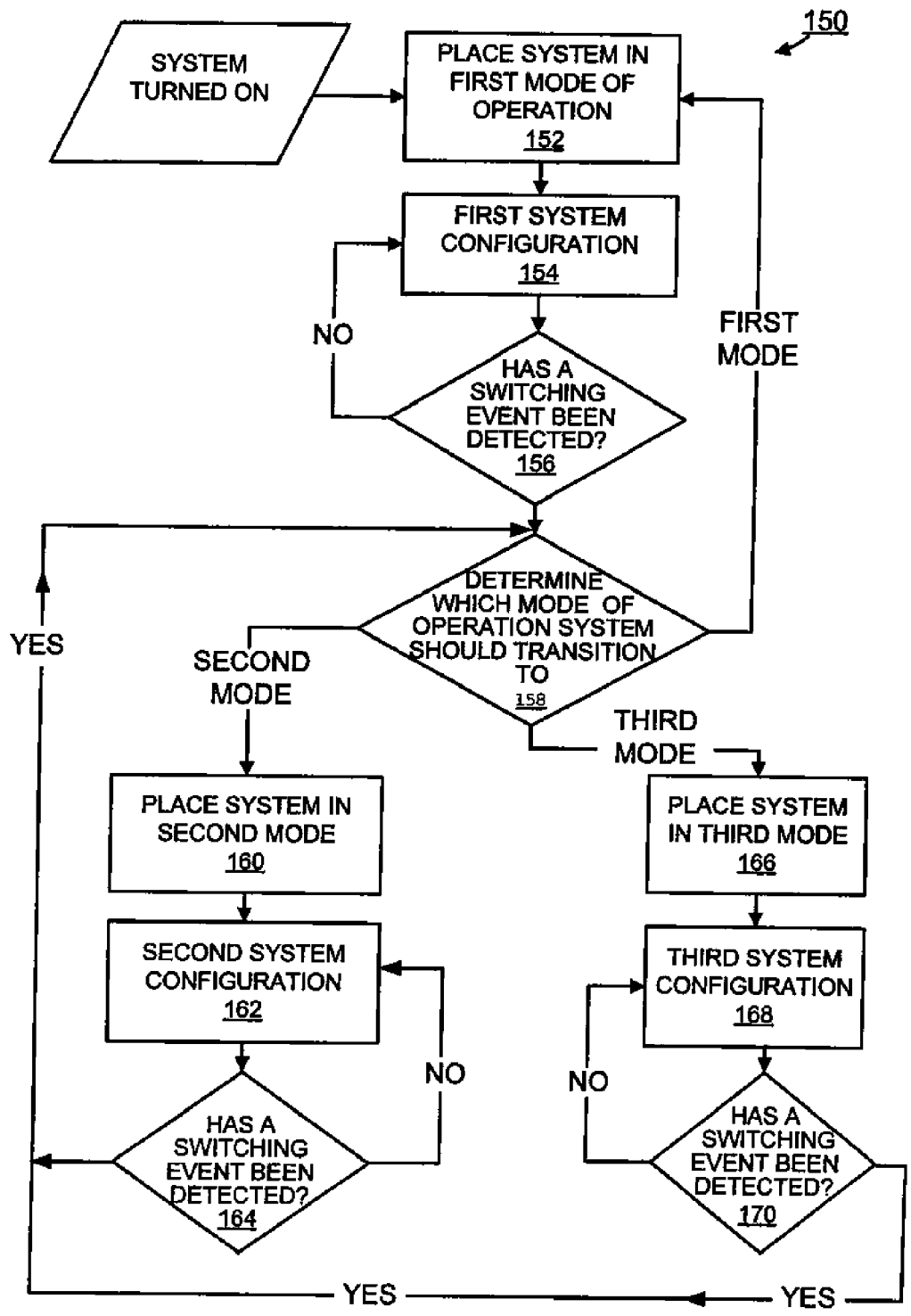
FIG. 2B is a flow-chart illustrating the operation of a mode detection process in a tri-mode audio system.

Additionally, while a dual-mode audio system is illustrated in FIG. 2A, the concept may be extended to audio systems which operate in three or more modes of operation. For example, as shown in FIG. 2B, an audio system may have a first system configuration 154 (with a first topology and a first set of signal processing operations) in a conventional mode when all of the doors of the automobile are closed, a second system configuration 162 (with a second topology and second set of signal processing operations) when one set of doors (e.g., a tailgate only) are open, and a third system configuration 168 (with a third topology and a third set signal processing operations) when a different set of doors (e.g., a tailgate and a rear door) are open. When a switching event occurs 156, 164, 170, mode detection process 150 determines 158 the proper mode of operation 152, 160, 166 based on the state of a switch and/or the state of one or more physical conditions of the automobile (e.g., whether doors are opened/closed, engine is off/running, passenger in/out of driver's seat, etc.) and modifies the audio data accordingly.

As shown in FIG. 3, audio system 20 also may include a battery monitoring process 200 which may receive input 202 from the automobile 10 that indicates whether the engine of the automobile is running, which tells the audio system whether the primary power supply is the automobile's battery or another power source such as an alternator. Numerous possible signals could be provided to indicate whether or not the engine is running, such as a tachometer signal indicating the RPM of the engine (i.e., if RPM is zero, then the engine is not running and power is being drawn primarily from the battery), a signal indicating the state of the ignition lock (i.e., if the ignition is locked then the automobile is not running), or any of a number of digital signals that may be available on a communications bus which may be included in a vehicle electrical system.

If the battery condition monitoring process 200 detects that the engine is running 203 (and thus power is not being primarily drawn from the battery), then there is no adjustment to the system configuration in order to conserve battery power 204.

When the battery condition monitoring process 200 detects that the engine is not running 203 (and thus power is being primarily drawn from the battery), the system 20 may adjust system configuration (i.e., system topology, signal processing operations or both) to conserve battery power 206 using a variety of techniques without substantially degrading system performance. For example, since the front speakers (e.g., 24a-b, 24c-24d in FIG. 1A) consume power but do not appreciably affect system performance outside the rear of the vehicle, the system may be configured to shut off the front pair speakers when operating under battery power in open mode. Similarly, the rear speakers (28a-28b in FIG. 1A) may be shut off when operating in the conventional mode. Thus, it should be understood that the adjustment to signal processes to conserve power 206 may differ depending on the mode of operation of the audio system 20. By adjusting system configuration in order to conserve power when the battery monitoring process detects that the engine is not running, the system is able to extend the length of time it may operate under battery power.

Speakers may be shut off in a variety of ways, including by muting the output of the amplifier feeding a particular speaker, placing the amplifier in a standby mode (many commercially-available amplifier integrated circuits, such as the TDA 8567Q amplifier manufactured by Philips® Semiconductor, are configured with both mute and standby modes), reducing the audio signal fed into an amplifier to substantially zero, interrupting the signal path between an amplifier and a speaker, or removing power from an amplifier feeding a particular circuit or speaker.

Since a significant amount of power is concentrated in the low frequency portion of music, the system may the raise cutoff frequencies (or increase the order of attenuation as a function of frequency, or both) of high pass filters that may be located in the signal path of one or more of the signals delivered to the speakers in order to conserve power.

Power may also be conserved by reducing the magnitude of the voltage of the audio signal applied to one or more speakers. One technique for reducing the magnitude of the voltage is to reduce the gain in the signal path of the audio signal (which can be done by changing the gain of an amplifier, or the attenuation of a passive attenuator in analog implementations, or by changing coefficients in digital filters or digital multiplication operations in digital systems). Another technique for reducing the magnitude of the voltage of audio signals is through the use of a dynamic range control device in the signal path of the audio signal. A dynamic range control device is a device which limits, compresses, expands or otherwise changes the dynamic range of an audio signal.

One use of dynamic range control devices in audio systems is to keep a device (typically a power amplifier) from clipping its output. A dynamic range control device used in this type of application is commonly known as a limiter and is configured to keep the maximum voltage applied to the amplifier below a set minimum value under all operating conditions.

Dynamic range control devices are typically constructed using a variable gain element (such as an amplifier in an analog implementation or a multiplier in a digital implementation), a control element, and a signal detector of some type (typically a level detector to detect, peak, average or RMS level of a signal, although other types of detectors are also possible), where the gain of the variable gain element is varied as some function of the detected signal of interest by the control element. The function defines the relationship between the gain of the variable gain element and the detected quantity of the signal of interest. The nature of the function may change depending on the detected quantity, or may remain constant over the entire range of detected values. For example, a threshold value for the detected quantity may be determined, where the gain of the variable gain element is not changed as long as the detected quantity remains below the threshold value, but the gain is changed according to the specified function if the detected quantity exceeds the threshold level. Limiters work by reducing the gain of the variable gain element when the sensed parameter of the signal exceeds some set threshold value, which is usually chosen to allow maximum output of a device (such as a power amplifier) without clipping. Thus, in one embodiment the battery monitoring process may reduce the maximum voltage of an audio signal applied to one or more speakers by lowering the threshold value of a limiter when the battery monitoring process 200 detects that the audio system 20 is primarily running off of the battery.

Referring again to FIG. 3, the battery condition monitoring process 200 receives input 208 about various operating conditions of the battery and estimates the approximate amount of energy remaining in the battery, in order to ensure that there is sufficient charge remaining in the battery to re-start the automobile. If the estimated battery capacity reaches or falls below 209 a predetermined threshold value, then the system 20 may notify the user that battery energy is getting low 210 and may take further power conservations measures 212.

The battery condition monitoring process 200 receives input 208 indicating various factors related to the current operating condition of the battery. These conditions may include the discharge current magnitude and rate, the accumulated time discharging has been occurring, the ambient temperature, battery output voltage, and other conditions that one skilled in the art might wish to monitor in order to estimate the remaining capacity of the battery. From these conditions, process 200 estimates the remaining capacity of the battery.

The voltage profile of a battery is the relationship between the battery output voltage and the discharge conditions (length of time the battery has been discharging, rate of discharge, magnitude of discharge current, temperature). The output voltage of a secondary (re-chargeable) battery decreases over time according the discharge conditions. Batteries, like lead-acid batteries commonly used in automobiles, do not have a singular discharge curve over all operating temperatures and discharge currents. Rather, a particular battery's voltage profile curve is a function of the operating conditions described above. The set of battery voltage profile curves for a particular battery are readily available from the manufacturer. Manufacturers also provide curves showing battery capacity as a function of operating conditions. One technique for estimating the remaining capacity of the battery involves determining where the battery is operating on its appropriate discharge (profile) curve, given the (monitored) operating conditions. From this information and the capacity information available from the manufacturer, the remaining battery capacity can be estimated.

Another technique for estimating the remaining capacity of the battery is to estimate the state of charge of the battery by measuring how much energy is put into it during charging and how much energy is drained from it when it is in use. This is sometimes called coulomb counting. In a separate embodiment, a battery monitoring process may monitor the amount of current being discharged from the battery as well as the amount of current that charges the battery and, from these measurements, estimate the remaining charge in the battery.

When the estimated capacity reaches a predetermined value above the minimum level necessary for normal re-starting of the vehicle (which is set as the battery capacity threshold value), the battery condition monitoring process 200 will inform the user 210 by issuing an alarm, which can be audible (e.g., output through the audio system) or visual (e.g., on a visual display) or tactile (e.g. actuate a vibrating device such as a pager). In other separate embodiments, the battery condition monitoring process 200 may shut down the audio system or place the system in a standby (or sleep) mode in which all unnecessary components, including all amplifiers, are shut off when the estimated capacity reaches the battery capacity threshold value. Also, in a vehicle equipped with remote starting capability, a battery condition monitoring process may trigger the remote starting process to periodically start the vehicle to recharge the battery when the estimated capacity reaches the battery capacity threshold value.

In other separate embodiments, a battery condition monitoring process may have several predetermined thresholds which cause the system to take different power conservation measures (e.g., shutting off speakers, adjusting equalization, automatically starting the automobile, reducing the magnitude of voltage of the audio signals applied to a speaker, placing the system in a standby mode, shutting off the system etc.) at different predetermined thresholds.

In another embodiment, an audio system may include a battery monitoring process which does not estimate the remaining capacity of the bay, but which monitors one or more operating conditions of the battery such as the discharge current, current drawn by the audio system, temperature, or the battery's voltage. The battery monitoring process which monitors the operating condition of the battery may take one or more actions, such as triggering an alarm, reducing power consumption, placing the system in a standby mode, or completely shutting down the system, if the operating condition of the battery reaches a predetermined state. The predetermined state may be the state of one or more of the monitored conditions such as the battery voltage, discharge current, and ambient temperature, or a combination of conditions.

It should be noted that any number of the known techniques for estimating the remaining capacity of a battery or monitoring the operating condition of a battery may be utilized in other embodiments and the invention is not limited to the particular embodiments described above.

In other separate embodiments, an audio system may raise the cut-off frequencies of the high pass filters, shut off speakers, limit the gain of the amplifiers, reduce the dynamic range of audio signals, or take other energy conservation measures either whenever operation on battery power is detected (as shown in FIG. 2A), or when remaining battery energy decreases to a predetermined threshold. It should be understood that a battery monitoring process may be implemented in a dual mode audio system (as in audio system 20 shown in FIG. 1A-1B) or in a purely conventional audio system.

The circuitry implementing the mode selection, battery condition monitoring processes, and system configurations 100, 200, 106, 112, 206, 210, 212 illustrated in FIG. 2-3 may be implemented in hardware, software, firmware or the like in one or more locations in the audio system 20. For example, the circuitry for all of the processes may be physically located in the front control console 21 or rear control console 22 (in FIG. 1A) or the circuitry may be distributed across several devices of the system.

Figure 4:
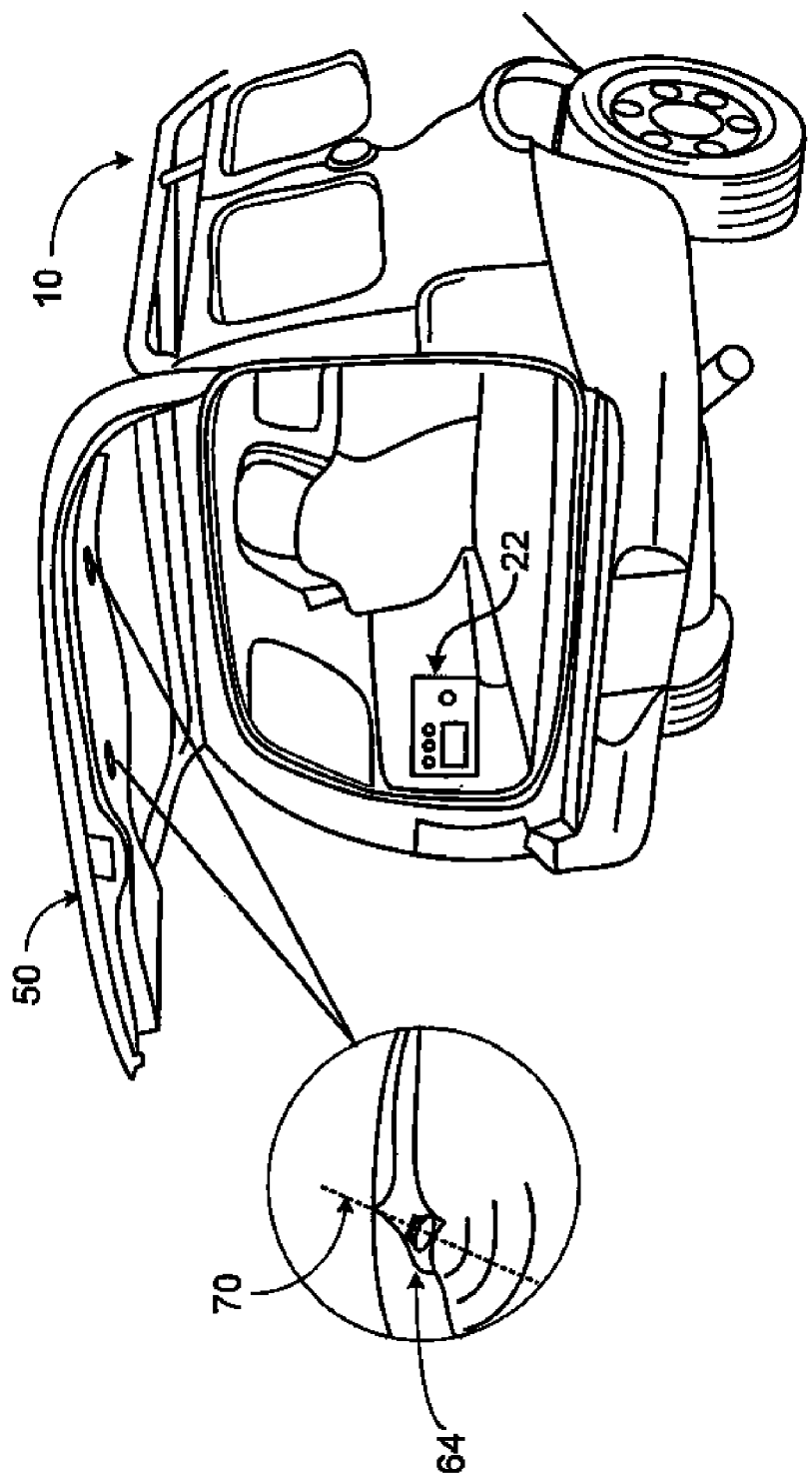
FIG. 4 is a diagram of a sport utility vehicle having a rear set of controls and rear speakers mounted on its tailgate.

In a conventional vehicle audio system, the audio sources are typically located in front of the vehicle or at least a control interface for the audio sources is located in the front. When the audio system is operating in the open mode, for convenience, the audio sources or at least a set of controls for the audio sources should be accessible from the open tailgate (or door), which would normally be at the rear of the vehicle where the listeners would be located. As shown in FIG. 4, a duplicate set of user controls 22 is provided within the vehicle 10 cabin near the opening of the rear tailgate 50. This may be a complete set of duplicate controls, such as source selection, volume, and source transport controls (e.g., play, stop, pause, skip forward, skip backwards, fast forward, fast reverse, pre-set selection, tune up or down, etc.). Alternatively, the rear console may be some subset of the complete control interface present in the front of the vehicle. Additionally, FIG. 4 shows a set of speakers 64 mounted on the vehicle's tailgate 50 such that their primary axis of radiation 70 is directed at an angle of approximately 45 degrees relative to the plane of the ground on which the vehicle sits when the tailgate 50 is opened, and the primary axis of radiation 70 substantially faces into the passenger compartment of the vehicle when the tailgate is closed.

An additional way of controlling the audio sources from the rear of the vehicle is to implement the control functions using a remote control. A separate remote control may be used, or audio system control functions could be integrated onto a vehicle key fob remote, similar to those for remote keyless entry. Using a key fob remote, a plurality of buttons can be added to the key fob to provide limited audio function controls such as volume and source selection. Alternatively, existing key fob remote buttons that operate normal functions such as lock and unlock with the vehicle operating in conventional mode, can be re-mapped to operate audio functions when the vehicle is operating in open mode. Re-mapping could occur by activating a switch, button, or a sequence of buttons to change the remote function from normal vehicle functions to audio system functions. For example, one method to do this is by adding a shift button that changes the functions of other buttons on the remote. Alternatively, the vehicle could sense the mode, and change its interpretation of the commands sent by the key fob remote. For example, lock and unlock could become volume up and down when the system was operating in open mode.

Additionally, one or more external audio system inputs may be provided in the rear of the vehicle. For example, one input may be optimized to accept the output of a microphone. In this case, additional pre-amplification (and possibly a separate volume control) may be required. This would allow the vehicle to be used as a portable public address system. A line level input may also be provided. This would allow additional sources, such as a portable MP3 or CD player, to be connected to the system and be easily accessible from the rear.

Other features may be included in a rear control panel. For example, when the vehicle is equipped with an integrated video source (DVD-video, VHS, etc), a video output jack can be made accessible from the rear of the vehicle, so a video display may be attached.

FIGS. 5A-5D illustrate several locations where rear speakers may be mounted in order to provide high quality sound for both modes of operation. It should be noted that the speakers illustrated in FIGS. 5A-5D may be upper frequency speakers (e.g., tweeters, mid-ranges), or may be substantially full range speakers (which radiate sound over the majority of the audible frequency range of the human auditory system). Additionally, although speakers 60, 62, 64, and 66 shown in FIGS. 5A, 5B, 5C, and 5D, respectively, are shown as individual transducers, it should be understood that the speakers may also be mounted within enclosures.

The primary axis of radiation of a speaker is the direction in which the speaker radiates maximum energy over the majority of its operating range. This direction is typically in line with physical center axis of symmetry of an axi-symmetric transducer. For ease of understanding, axi-symmetric transducers are assumed to be used here, and the axis of primary radiation is assumed to be aligned with the center axis of symmetry of the transducer and points away from the front surface of the primary radiating surface of the transducer, where the front surface is the surface that is coupled to the listening environment. It should be noted, however, that the invention is not limited to use of axi-symmetric transducers. The orientations described can be adjusted as needed such that sound radiation is directed in the desired directions.

Figure 5A:
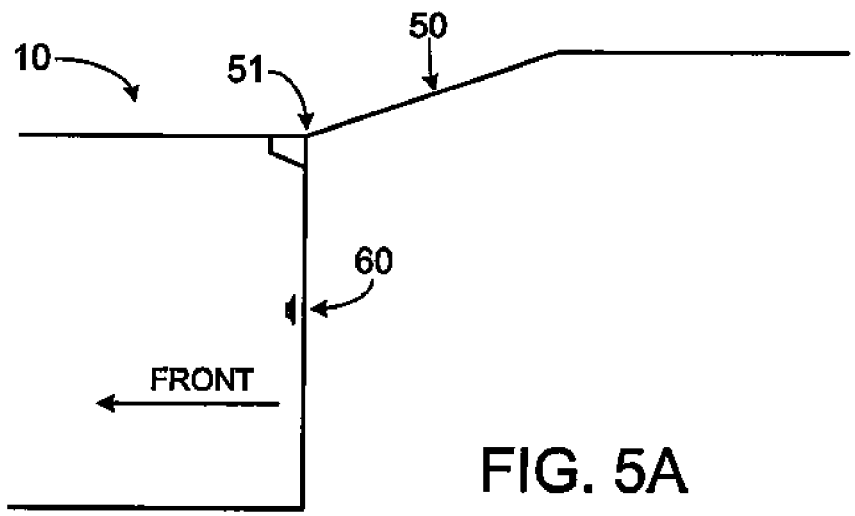
FIGS. 5A-5D are side views of an automobile having rear speakers mounted in four different locations.

As shown in FIG. 5A, an automobile 10 includes a rear tailgate 50 having an upper hinge 51 which is shown as open. A pair of rear speakers 60 (e.g., mid-range speakers) are mounted within the automobile cabin near the opening of the tailgate 50 such that the pair of speakers 60 are outwardly directed from the cabin when the tailgate 50 is opened. When the tailgate 50 is closed, sound from speaker pair 60 is reflected off of the tailgate back into the automobile cabin. There are numerous locations in the rear portion of the cabin of the automobile where speakers 60 may be mounted and the invention is not limited to the specific location illustrated in FIG. 5A. Additionally the speaker pair 60 may be oriented such that they do not point directly at the tailgate 50 when the tailgate is closed, but may be angled with respect to the tailgate 50. For example, in separate embodiments, speaker pair 60 may be mounted on the cabin floor, cabin ceiling, cabin sidewalls, rear cabin deck, or back of the rearmost seat in the automobile 10. Finally, an additional speaker, such as a subwoofer, may also be mounted within the passenger compartment near the tailgate.

Figure 5B:
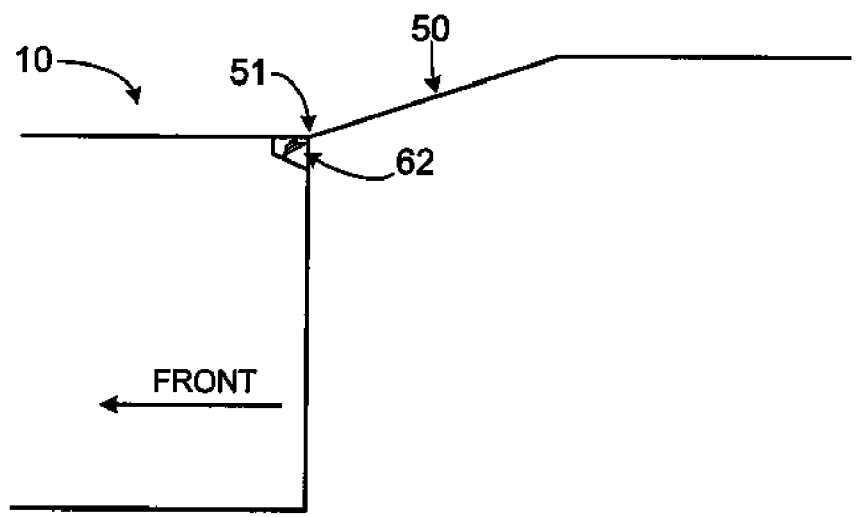
Figure 5C:
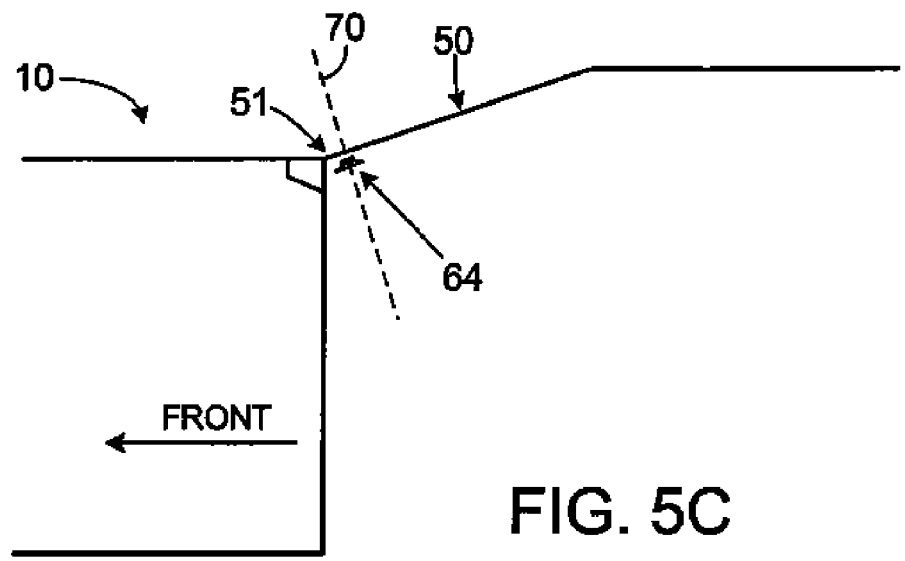

FIGS. 5B-5C illustrate additional separate embodiments of where pairs of rear speakers may be mounted on an automobile 10 having a tailgate 50. Specifically, FIG. 5B shows a pair of rear speakers 62 mounted within the automobile cabin near the top hinge 51 of the tailgate 50.

FIG. 5C shows a pair of rear speakers 64 mounted on the tailgate 50 such that the left speaker is located in the upper left-hand side of the tailgate and a right speaker is located in the upper right-hand side of the tailgate. The speakers 64 may be mounted within the trim of the tailgate 50. The speakers may also be mounted on a window on the tailgate 50 using methods similar to those used to attach a rear view mirror to a front windshield. The window mounted speakers may additionally be attached to the trim surrounding the window for additional structural support. The pair of rear speakers 64 are also oriented such that the primary axis of radiation 70 of the speakers 64 face substantially towards the rear of the automobile 10 and are angled at an angle of approximately 45 degrees relative to a plane parallel to the ground when the tailgate is open. Similarly, the primary axis of radiation 70 of the speakers 64 is pointed substantially towards the passenger cabin when the tailgate is closed. This speaker orientation may be particularly advantageous because it directs sound into the vehicle when the tailgate is closed and also outwardly directs sound from the vehicle when the tailgate is open. Thus, this speaker orientation is particularly well-suited for accommodating both modes of operation of the audio system.

Figure 5D:
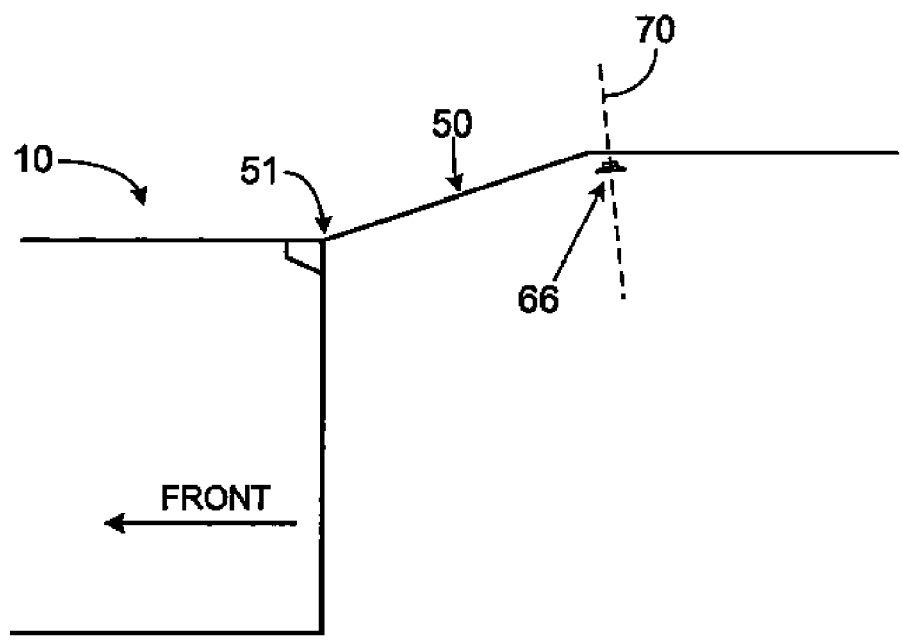

FIG. 5D shows another pair of rear speakers 66 mounted on the tailgate 50 roughly midway between the upper hinge 51 and lower edge 52 of the tailgate 50. While this speaker orientation is well-suited for operation in the conventional mode of operation because sound is directed into the passenger cabin when the tailgate is closed, this orientation may not be optimal for listeners that are located behind the automobile 10, away from the tailgate, as these listeners will be significantly off-axis to the main axis of radiation of the speakers 66.

While FIGS. 5A-5D illustrate various locations of a single pair of rear speakers, additional separate embodiments may include audio systems where multiple pairs of rear speakers are mounted at multiple locations in automobile cabin and tailgate. Additionally, note that speakers 60, 62, 64, and 66 shown in FIGS. 5A, 5B, 5C and 5D, respectively, represent a pair of speakers symmetrically located within the automobile, where the axis of symmetry is the centerline of the automobile 10.

A number of embodiments have been described, however, it is evident that those skilled in the art may make numerous modifications of the departures from the specific apparatus and techniques disclosed herein without departing from the inventive concepts. Consequently, the invention is to be construed as embracing each and every novel feature and novel combination of features present in or possessed by the apparatus and techniques disclosed herein and limited solely by the spirit and scope of the appended claims.

What is claimed is:

1. A method for operating an audio system having one or more equalization signal processes in a vehicle with a battery, the method comprising:

monitoring one or more operating conditions of the battery;

comparing one or more of the monitored conditions of the battery to a predetermined state; and if one or more of the monitored operating conditions of the battery reaches the predetermined state, then adjusting one or more of equalization signal processes to change the frequency response of the audio system, wherein one of the equalization processes includes a high pass filter having a cutoff frequency, and the step of adjusting one or more of the equalization processes comprises raising the cutoff frequency of the high pass filter.

2. The method of claim 1, wherein monitoring one or more operating conditions of the battery comprises one or more of following: sensing the output voltage level of the battery, sensing the discharge current of the battery; or sensing the ambient temperature.

* * * * *